(12) United States Patent
Wang et al.

(10) Patent No.: US 12,392,973 B2
(45) Date of Patent: Aug. 19, 2025

(54) OPTICAL FIBER CIRCUIT BOARD ASSEMBLY AND OPTICAL-ELECTRICAL HYBRID CIRCUIT BOARD

(71) Applicant: SHENNAN CIRCUITS CO., LTD., Shenzhen (CN)

(72) Inventors: Guodong Wang, Shenzhen (CN); Hua Miao, Shenzhen (CN); Xiaofeng Liu, Shenzhen (CN); Hao Luo, Shenzhen (CN)

(73) Assignee: SHENNAN CIRCUITS CO., LTD., Shenzhen (CN)

( * ) Notice: Subject to any disclaimer, the term of this patent is extended or adjusted under 35 U.S.C. 154(b) by 375 days.

(21) Appl. No.: 18/154,855

(22) Filed: Jan. 16, 2023

(65) Prior Publication Data
US 2023/0152540 A1    May 18, 2023

Related U.S. Application Data

(63) Continuation of application No. PCT/CN2020/142441, filed on Dec. 31, 2020.

(30) Foreign Application Priority Data

Aug. 28, 2020  (CN) .......................... 202010889482.6

(51) Int. Cl.
*G02B 6/42* (2006.01)
(52) U.S. Cl.
CPC ........... *G02B 6/428* (2013.01); *G02B 6/4249* (2013.01)
(58) Field of Classification Search
CPC .... G02B 6/428; G02B 6/4249; G02B 6/3608; G02B 6/423; G02B 6/4202; G02B 6/43; G02B 6/12; G02B 6/42
See application file for complete search history.

(56) References Cited

U.S. PATENT DOCUMENTS 10,976,506 B2 *   4/2021   Matsui ................. G02B 6/4249
2006/0192278 A1    8/2006   Furuyama et al.
(Continued)

FOREIGN PATENT DOCUMENTS

CN         1993639 A     7/2007
CN       203135893 U     8/2013
(Continued)

OTHER PUBLICATIONS

Chinese Second Office Action,Chinese Application No. 202010889482. 6, mailed Feb. 9, 2023 (10 pages).
(Continued)

*Primary Examiner* — John Bedtelyon

(57) ABSTRACT

The present application relates to the technical field of circuit boards. In particular, disclosed are an optical fiber circuit board assembly and an electro-optical circuit board. The optical fiber circuit board assembly comprises a substrate, which comprises a substrate body, the substrate body at least being provided with a first window; and a plurality of optical fiber units, which are arranged on the substrate, wherein one end of each of the plurality of optical fiber units extends to the first window and is used for being coupled to a plurality of optical devices, and the other end of each of the plurality of optical fiber units extends to the outside of the substrate. By the means, according to the present application, the assembly of optical interconnection and electrical interconnection can be simplified, thereby greatly improving efficiency.

18 Claims, 5 Drawing Sheets

(56) References Cited

U.S. PATENT DOCUMENTS

2009/0169219 A1    7/2009   Nakano et al.
2013/0188905 A1    7/2013   Hashiguchi

FOREIGN PATENT DOCUMENTS

| CN | 110187458 A | 8/2019 |
| CN | 209946450 U | 1/2020 |
| WO | WO2007114384 A1 | 10/2007 |

OTHER PUBLICATIONS

European Search Report, European Application No. 20951296.1, mailed Jan. 19, 2024 (10 pages).
International search report and Written Opinion, International Application No. PCT/CN2020/142441, mailed May 20, 2021 (13 pages).
Chinese First office action, Application No. 202010889482.6, mailed Jun. 15, 2022 (10 pages).

* cited by examiner

OPTICAL FIBER CIRCUIT BOARD ASSEMBLY AND OPTICAL-ELECTRICAL HYBRID CIRCUIT BOARD

CROSS REFERENCE TO RELATED APPLICATIONS

The present application is a continuation-application of International (PCT) Patent Application No. PCT/CN2020/142441, filed on Dec. 31, 2020, which claims the priority of Chinese patent application No. 202010889482.6, Aug. 28, 2020, and the entire contents of which are hereby incorporated by reference in their entireties.

TECHNICAL FIELD

The present disclosure relates to the field of circuit boards, and in particular to an optical fiber circuit board assembly and an optical-electrical hybrid circuit board.

BACKGROUND

Electrical interconnection refers to taking a metal line (generally a copper line) to achieve signal connection between a circuit board and a chip. Optical interconnection refers to taking a light-conducting medium (an optical fiber, an optical waveguide, and so on) to achieve signal connection between the circuit board and the chip.

Optical interconnection and electrical interconnection may be combined. However, in the art, the number of optical fibers for optical interconnections may be high, and the optical fibers may be disorganized and may be assembled difficultly.

SUMMARY OF THE DISCLOSURE

The present disclosure provides an optical fiber circuit board assembly and an optical-electrical hybrid circuit board to solve the technical problem that the optical interconnection and the electrical interconnection may be assembled difficultly.

In a first aspect, an optical fiber circuit board assembly is provided and includes: a substrate, including a substrate body, wherein the substrate body at least defines a first opening; a plurality of optical fiber units, arranged on the substrate, wherein an end of each of the plurality of optical fiber units extends to reach the first opening and is configured to couple with one optical element, and the other end of each of the plurality of optical fiber units extends to an outside of the substrate, wherein the optical element is a photoelectric conversion element.

In a second aspect, an optical fiber circuit board assembly is provided and includes: a substrate, including a substrate body, wherein the substrate body at least defines a first opening; a plurality of optical fiber units, arranged on the substrate, wherein an end of each of the plurality of optical fiber units extends to reach the first opening and is configured to couple with one optical element, and the other end of each of the plurality of optical fiber units extends to an outside of the substrate.

In a third aspect, an optical-electrical hybrid circuit board is provided and includes the optical fiber circuit board assembly as described in the above; a printed circuit board, laminated on and spaced apart from the optical fiber circuit board assembly; a first electronic element, arranged on the printed circuit board and arranged at a position corresponding to the first opening; and the plurality of optical elements, arranged on the printed circuit board and surrounding an outside of the first electronic element, wherein the plurality of optical elements are coupled to the first electronic element through the printed circuit board.

According the resent disclosure, a substrate body of the fiber optic circuit board assembly at least defines a first opening. An end of each of a plurality of optical fiber units extends to reach the first opening. In this way, the chip, the optical device coupled to the optical fiber units may be arranged inside the first opening. Further, the optical fiber units are integrated in the substrate, such that the optical fiber units may be well organized. In addition, the end of each optical fiber unit is fixed on an inside of the first opening, an order of the plurality of optical fiber units and a position of each optical fiber unit are fixed. In this way, the plurality of optical devices may not be repositioned the connected one by one, such that the optical interconnection and the electrical interconnection may be assembled simply, and an efficiency of assembling is greatly improved.

BRIEF DESCRIPTION OF THE DRAWINGS

In order to illustrate technical solutions in embodiments of the present disclosure more clearly, the accompanying drawings used in the description of the embodiments is briefly described below. Apparently, the following drawings show only some of the embodiments of the present disclosure, and any ordinary skilled person in the art may obtain other drawings based on the following drawings without any creative work.

DETAILED DESCRIPTION

Technical solutions in the embodiments of the present disclosure will be clearly and completely described below by referring to the accompanying drawings in the embodiments of the present disclosure. Obviously, the described embodiments show only a part of, but not all of, the embodiments of the present disclosure. Based on the embodiments in the present disclosure, all other embodiments obtained by any ordinary skilled person in the art without creative work shall fall within the scope of the present disclosure.

Figure 1:
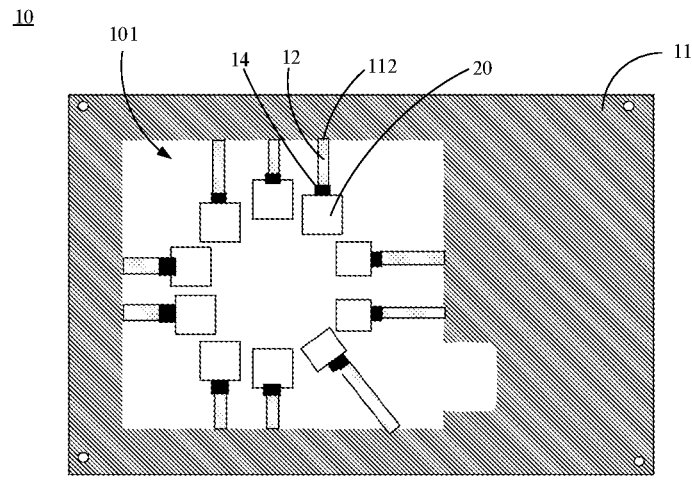
FIG. 1 is a structural schematic view of an optical fiber circuit board assembly according to an embodiment of the present disclosure.

As shown in FIG. 1, in the present embodiment, the optical fiber circuit board assembly 10 may include a circuit board that transmits only optical signals or may include a circuit board that transmits a mixed signal including the optical signals.

The optical fiber circuit board assembly 10 includes a substrate 11 and a plurality of optical fiber units 12. The substrate 11 includes a substrate body 111 at least defining a first opening 101. The plurality of optical fiber units 12 are arranged on the substrate 11. An end of each of the plurality of optical fiber units 12 extends to the first opening 101. The plurality of optical fiber units 12 are coupled to a plurality of optical elements 20. The other end of each of the plurality of optical fiber units 12 extends to an outside of the substrate 11.

In detail, a graphic transferring process may be applied in the present embodiment to define the first opening 101 at a central region or an edge region of the substrate body 111, i.e., a part of the substrate body 111 located at the central region or the edge region are removed. In this way, in a subsequent processing, electronic elements and the optical elements 20 may be arranged inside the first opening 101.

The optical fiber units 12 are arranged in the substrate 11 in a certain manner. All of the plurality of optical fiber units 12 may be arranged in a same manner or in different manners. Each optical fiber unit 12 includes at least one optical fiber, specifically includes one or more optical fibers, one or more groups of optical fibers, and so on. The number of fibers in each group of fibers may be determined based on actual requirements. For example, the number of fibers in each group of fibers may be determined based on a type of a to-be-connected connector, such as determined as 1, 4, 8, 12, 24, and so on. The number of groups of fibers may be determined based on requirements and is not limited herein.

Each optical fiber in the optical fiber unit 12 may be either a high temperature optical fiber or a common optical fiber. The difference between the high temperature optical fiber and the common optical fiber is that a coating layer on a surface of the high temperature optical fiber is made of material resistant to the high temperature, allowing the high temperature optical fiber to be applicable at the high temperature and harsh environments. By contrast, although a coating layer is arranged on a surface of the common optical fiber, the coating layer may lose a protective effect under the high temperature, such that the optical fiber may be easily damaged. A designer may configure the high temperature optical fiber or the common optical fiber to be the optical fiber unit 12, based on an application scenario of the optical fiber circuit board assembly 10. For example, when the optical fiber circuit board assembly 10 is required to operate at a temperature higher than 100° C. and to be bent repetitively, the high temperature optical fiber may be configured to serve as the optical fiber unit 12. To be noted that, by configuring the high temperature optical fiber to be the optical fiber unit 12, an operating temperature of the optical fiber circuit board assembly 10 may be broadened, and the optical fiber circuit board assembly 10 may be processed in a laminated manner, such that a method of processing the optical fiber board assembly 10 may be diversified.

According to the present disclosure, the substrate body of the optical fiber circuit board assembly in the present disclosure at least defines the first opening. An end of each of the plurality of optical fiber units extends to the first opening. In this way, the chip and the optical elements coupled to the optical fiber units may be arranged inside the first opening. The optical fiber units are integrated in the substrate, such that the optical fiber units may not be disorganized. In addition, the end of each of the plurality of optical fiber units is fixed to the inside of the first opening. Further, the order and positions of the plurality of optical fiber units are fixed. The plurality of optical fiber units may be repositioned the connected one by one, such that the optical interconnection and the electrical interconnection may be assembled simply, and an efficiency of assembling may be increased significantly.

As shown in FIG. 1, in an embodiment, the substrate 11 further defines a first fiber outlet 112. A plurality of first fiber outlets 112 are defined in an inside of the first opening 101 of the substrate body 111 and protruding toward a center of the first opening 101. The plurality of optical fiber units 12 are embedded in the substrate 11. Each of the plurality of optical fiber units 12 extends out from one of the plurality of first fiber outlets 112 to reach the first opening. In other embodiments, an outer edge of each of the plurality of first fiber outlets 112 is aligned with an inner edge of the first opening 101.

To be noted that, for each optical fiber, a length of the optical fiber unit 12 is greater than a length of the substrate 11 in an extension direction of the optical fiber, such that the optical fiber unit 12 may be connected to an optical connector. Furthermore, since the plurality of first fiber outlets 112 are spaced apart from each other. Therefore, each first fiber outlet 112 may be bent based on actual needs, such that the plurality of first fiber outlets 112 may have different outlet directions.

Further, the optical fiber circuit board assembly 10 includes a first fiber interface 14. An end of the optical fiber unit 12 extends out from the first fiber outlet to reach the inside of the first opening 101 and to connect to the first fiber interface 14. The first fiber interface 14 is configured to connect to the optical element 20.

The first fiber interface 14 may include the optical connector and the optical fiber unit 12 extending from the first fiber outlet. The optical connector is arranged with a positioning structure. Specifically, the positioning structure may be received in an inner cavity of the optical connector. The optical connector may be configured to receive the optical fiber unit 12 extending from the first fiber outlet in the optical fiber circuit board assembly 10 and to position the optical fiber unit 12 by the positioning structure.

Specifically, the first optical interface 14 may include a single-line optical connector and/or a multi-line optical connector and an optical fiber unit 12 extending from the first fiber outlet. The single-line optical connector is arranged with a positioning structure to position one line of optical fiber unit 12 and to receive and position one line of optical fiber unit 12 extending from the substrate 11. The multi-line optical connector is arranged with a positioning structure to position a plurality of lines of optical fiber units 12 and to receive and position the plurality of lines of optical fiber units 12 extending from the substrate 11.

While manufacturing the substrate, regardless of the single-line optical connector or the multi-line optical connector, corresponding optical fiber units 12 need to be inserted into the inner cavity of the optical connector, and subsequently, the optical fibers may be fixed by glue. Further, excess optical fibers may be removed, and the fixed optical fibers may be grounded and polished. In this way, the first fiber interface 14 meeting requirements may be obtained.

Figure 2:
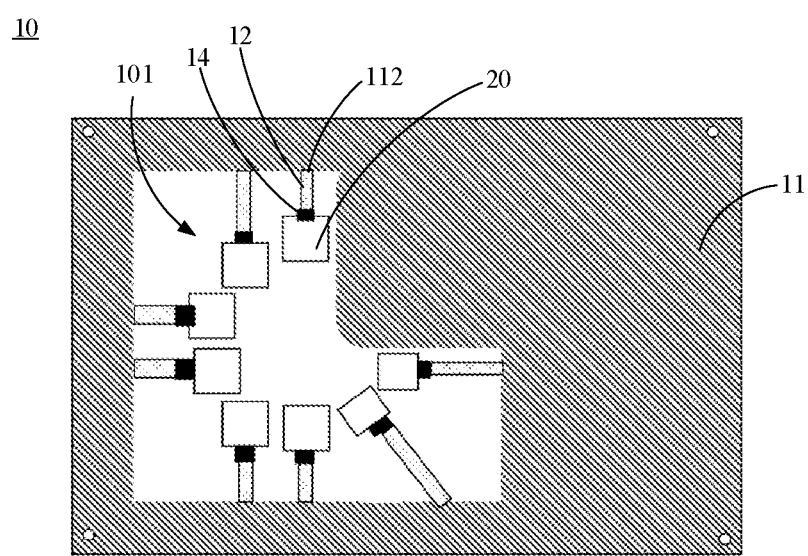
FIG. 2 is a structural schematic view of an optical fiber circuit board assembly according to another embodiment of the present disclosure.
Figure 3:
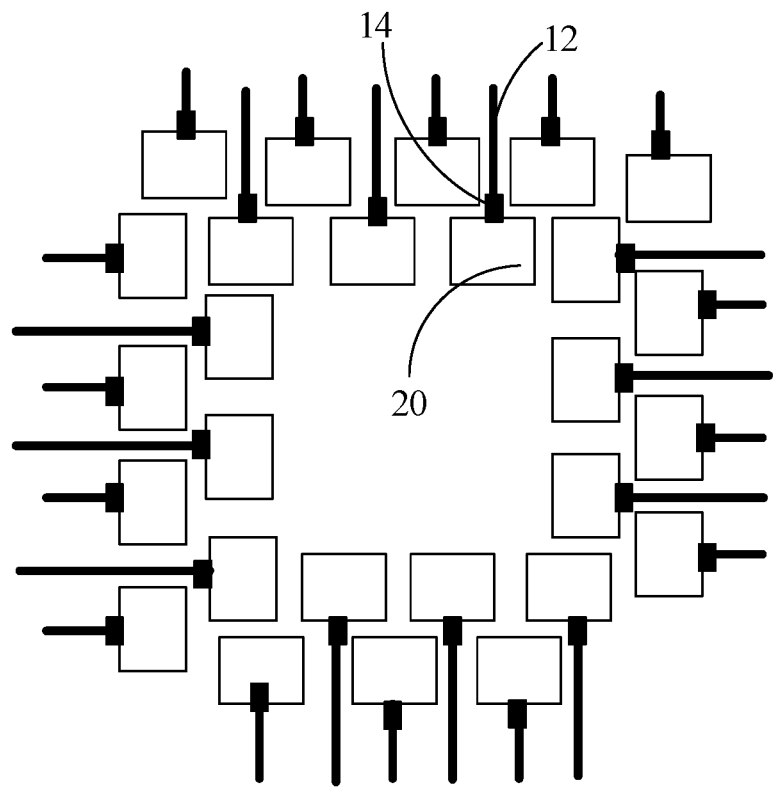
FIG. 3 is a structural schematic view of a part of the optical fiber circuit board assembly according to the another embodiment of the present disclosure.

As shown in FIG. 2 and FIG. 3, in an embodiment, the plurality of first fiber outlets 112 are spaced apart from each other and are located on at least half of an inner side of the first opening 101. Further, the plurality of first fiber outlets 112 may be distributed to enclose or semi-enclose the entire inner side.

Specifically, the first opening 101 may be quadrangular. The plurality of first fiber outlets 112 are spaced apart from each other and are located on two inner edges, three inner edges, or four inner edges of the first opening 101. When the plurality of first fiber outlets 112 are spaced apart from each other and are located on the four inner edges of the first opening 101, the plurality of first fiber outlets 112 surrounds the inner side of the first opening 101.

In the art, the optical fiber circuit board is fixed to a surface or a substrate of the optical fiber circuit board by an adhesive. However, due to a signal line between the optical element and the first electronic element being excessively long, the chip, when operating, may be electromagnetically interfered by an electromagnetic environment surrounding the chip, such that it may be difficult to ensure the chip to operate normally. Compared to the related art, the optical elements in the present disclosure are arranged to surround an outside of the first electronic element, allowing the signal line between the optical element and the first electronic element to be minimized, and parallel wires may be avoided. In this way, shortcomings in the art caused by the signal line between the optical element and the first electronic element being excessively long may be overcome.

The first opening 101 may be circular or elliptical. The plurality of first fiber outlets 112 are spaced apart from each other and may occupy a half of, three fourths of or the entirety of an inner circumference of the first opening 101. When the plurality of first fiber openings 112 are spaced apart from each other and are distributed on the entire inner circumference of the first opening 101, the plurality of first fiber outlets 112 surround the inner side of the first opening 101.

In an embodiment, a distance between an end of one first fiber outlet 112 and a center of the first opening 101 may be different from a distance between an end of another first fiber outlet 112 adjacent to the one first fiber outlet 112 and a center of the first opening 101. A distance between the ends of the two adjacent first fiber outlets 112 may be at least greater than or equal to a size of the optical element 20.

Specifically, the distance between the ends of adjacent first fiber outlets 112 is at least greater than or equal to the size of the optical element 20, such that, in subsequent processing, there may be enough space to receive two optical elements 20 which are connected to the two adjacent first fiber interfaces 14, respectively, and the two optical elements 20 may be spaced apart from each other for heat dissipation. In some embodiments, the distance between the ends of the adjacent first fiber outlets 112 is at least greater than or equal to a diagonal distance of the optical element 20.

In an embodiment, the plurality of first fiber outlets 112 are classified into at least two groups based on distances from the center of the first opening 101 to the end of each of the plurality of first fiber outlets 112, and the two groups of first fiber outlets 112 are alternately arranged.

Specifically, the two groups of first fiber outlets 112 may be arranged in a semi-annular array, in a symmetrical array, or in a double-annular array. In this way, the first fiber interfaces 14 may be arranged symmetrically or in the double-annular array, and the optical elements 20 coupled to the first fiber interfaces 14 may be arranged symmetrically or in the double-annular array, such that a distribution density of the optical elements 20 may be increased, and an integrity of the circuit board may be increased.

Figure 4:
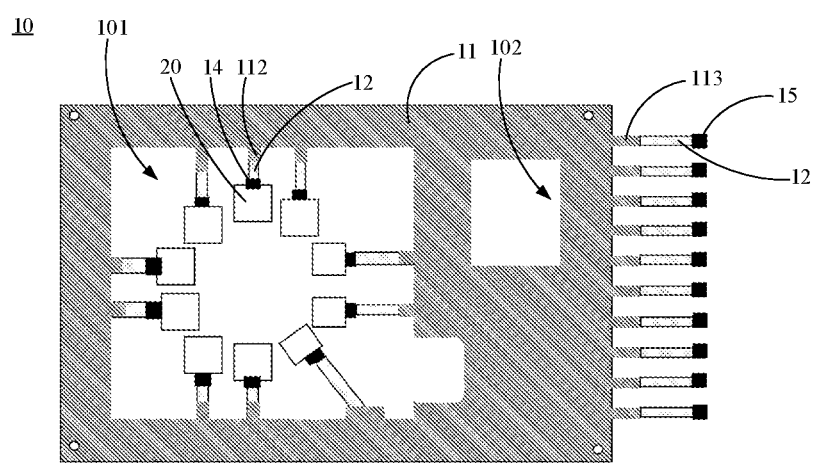
FIG. 4 is a structural schematic view of an optical fiber circuit board assembly according to still another embodiment of the present disclosure.
Figure 5:
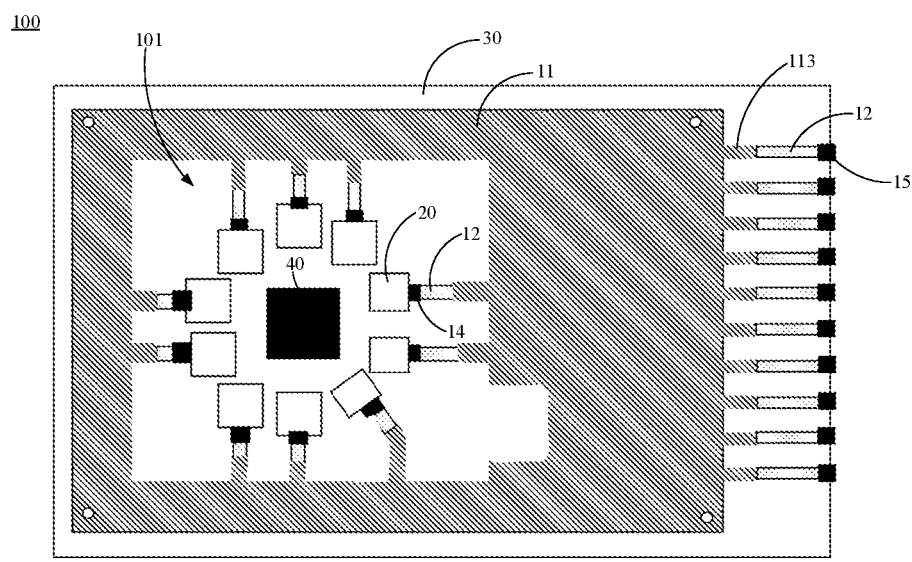
FIG. 5 is a structural schematic view of an optical-electrical hybrid circuit board according to a first embodiment of the present disclosure.
Figure 6:
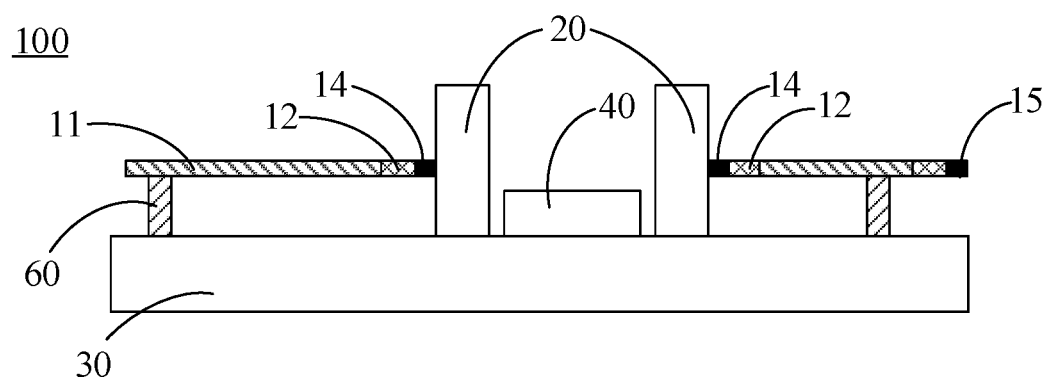
FIG. 6 is another structural schematic view of the optical-electrical hybrid circuit board according to the first embodiment of the present disclosure.
Figure 7:
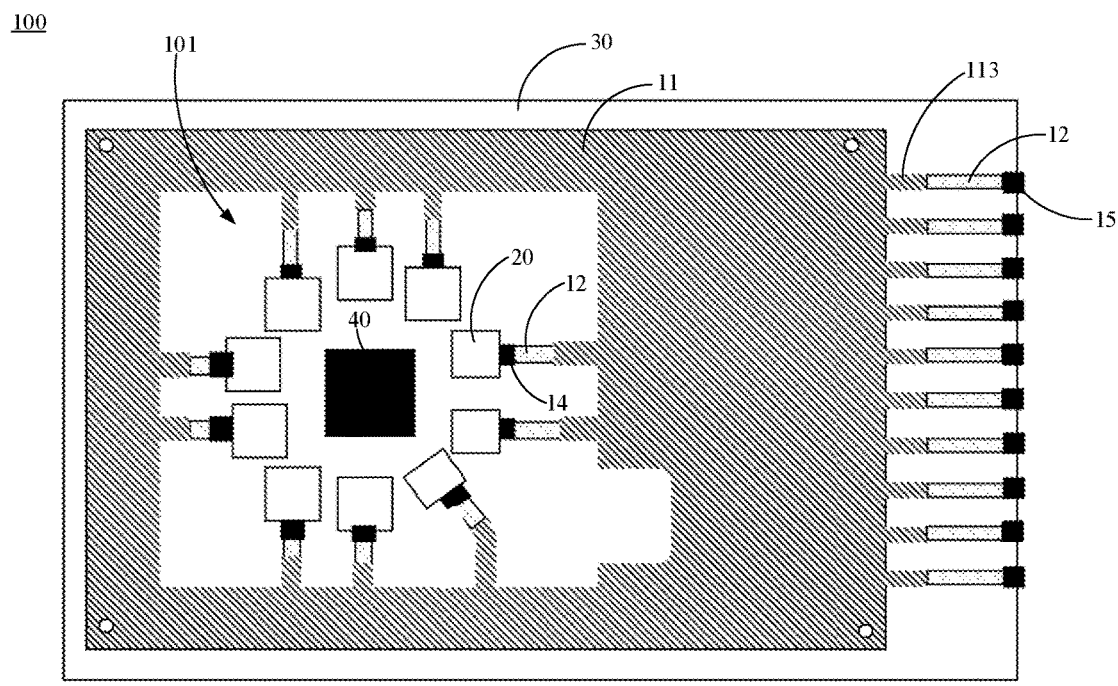
FIG. 7 is a structural schematic view of an optical-electrical hybrid circuit board according to a second embodiment of the present disclosure.
Figure 8:
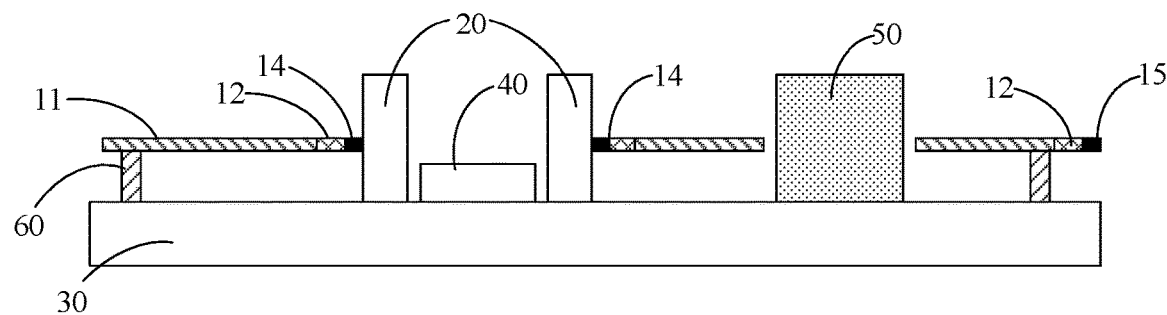
FIG. 8 is another structural schematic view of the optical-electrical hybrid circuit board according to the second embodiment of the present disclosure.

As shown in FIG. 4, in an embodiment, the optical fiber circuit board assembly 10 includes at least one second fiber interface 15. The substrate 11 further includes at least one second fiber outlet 113. A plurality of second fiber outlets 113 are protruding outwardly from the substrate 11. In some embodiments, the number of the at least one second fiber outlet 113 is more than one, and the number of the at least one second fiber interface 15 is more than one. The plurality of optical fiber units 12 are embedded in the substrate 11, and the optical fiber units 12 extend out from the more than one second outlets 113 and are connected to the more than one second fiber interfaces 15.

In an embodiment, the plurality of second fiber outlets 113 are spaced apart from each other and are all arranged on one side of the substrate 11. Specifically, outer edges of the second fiber outlets 113 may be aligned with an outer side of the substrate 11.

The second fiber interface 15 may include an optical connector and an optical fiber unit 12 extending from the second fiber outlet. The optical connector is arranged with a positioning structure. The positioning structure may be received in an inner cavity of the optical connector. The optical connector may be configured to receive the optical fiber unit 12 extending from the second fiber outlet in the optical fiber circuit board assembly 10 and to position the optical fiber unit 12 by taking the positioning structure.

Specifically, the second optical interface 15 may include a single-line optical connector and/or a multi-line optical connector and the optical fiber unit 12 extending from the second fiber outlet. The single-line optical connector is arranged with a positioning structure to position one line of optical fiber unit 12 and to receive and position one line of optical fiber unit 12 extending from the substrate 11. The multi-line optical connector is arranged with a positioning structure to position a plurality of lines of optical fiber units 12 and to receive and position the plurality of lines of optical fiber units 12 extending from the substrate 11.

While manufacturing the substrate, regardless of the single-line optical connector or the multi-line optical connector, corresponding optical fiber units 12 need to be inserted into the inner cavity of the optical connector, and subsequently, the optical fibers may be fixed by glue. Further, excess optical fibers may be removed, and the fixed optical fibers may be grounded and polished. In this way, the second fiber interface 15 meeting requirements may be obtained.

Figure 10:
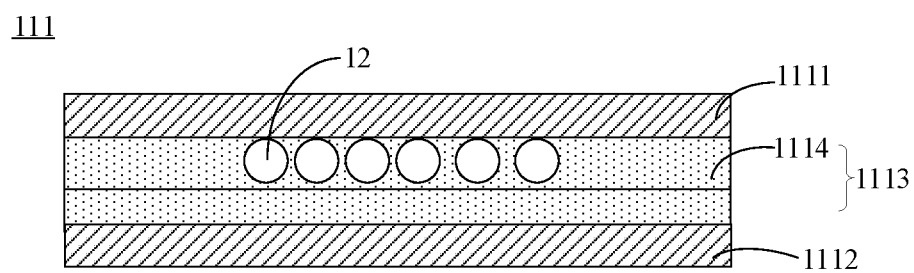
FIG. 10 is a structural schematic view of a substrate body of an optical fiber circuit board assembly according to an embodiment of the present disclosure.

As shown in FIG. 10, in some embodiments, the substrate body 111 includes: a first film layer 1111, a second film layer 1112, and a binding layer 1113. The first film layer 1111 and the second film layer 1112 are laminated on and spaced apart from each other. At least some of the plurality of optical fiber units 12 are disposed between the first film layer 1111 and the second film layer 1112. The binding layer 1113 is received in the remaining space between the first film layer 1111 and the second film layer 1112 other than a space occupied by the some of the plurality of optical fiber units 12, such that the some of the plurality of optical fiber units 12 are fixed relative to the first film layer 1111.

In an embodiment, the first film layer 1111 is made of flexible material, and the second film layer 1112 and the binding layer 1113 are made of thermosetting or thermoplastic material. The binding layer 1113 includes two adhesive layers 1114 that are laminated with each other. At least some of the plurality of optical fiber units 12 are disposed between the two adhesive layers 1114 or arranged inside one of the two adhesive layers 1114.

In another embodiment, the first film layer 1111 and the second film layer 1112 may be made of the flexible material. The binding layer 1113 includes two adhesive layers 1114 that are laminated with each other. At least some of the plurality of optical fiber units 12 are disposed between the two adhesive layers 1114 or arranged inside one of the two adhesive layers 1114. Each of the two adhesive layers 1114 is made of the thermosetting material or the thermoplastic material.

Specifically, the flexible material may be flexible composite material, such as polyimide, polyethylene terephthalate, polydimethylsiloxane, and so on. The first film layer 1111 is made of the flexible material, such that a flexible substrate 11 may be obtained and may be able to withstand repetitive bending, allowing the flexible substrate 11 to be arranged at a desired position. fA thickness of the first film layer 1111 may be not greater than 100 μm, such as in a range of 20 μm-100 μm, specifically such as 20 μm, 25 μm, 45 μm, 65 μm, 85 μm, 100 μm, and so on, which will not be limited herein.

The binding layer 1113 is disposed between the first film layer 1111 and the second film layer 1112 adjacent to the first film layer 1111, such that the first film layer 1111 and the second film layer 1112 may be connected with each other through the binding layer 1113. A corresponding one of the plurality of optical fiber units 12 is fixed between the first film layer 1111 and the second film layer 1112 by the binding layer 1113. Further, the binding layer 1113 is received in the remaining space between the first film layer 1111 and the second film layer 1112 other than the corresponding optical fiber unit 12.

To be noted that, the binding layer 1113, when being excessively thin, may not be able to fix the optical fibers; and the binding layer 1113, when being excessively thick, may not be able to maintain flexibility of the substrate 11. The thickness in this context refers to a thickness of the binding layer 1113 in a direction perpendicular to a plate surface of the first film layer 1111 and the second film layer 1112. In the present embodiment, a thickness of a thinnest region of the binding layer 1113 between the first film layers 1111 and the second film layer 1112 adjacent to the first film layers 1111 is greater than one-tenth of a diameter of the optical fiber unit 12 and is less than 10 times the diameter of the optical fiber unit 12, or greater than a half of the diameter of the optical fiber unit 12 and less than two times of the diameter of the optical fiber unit 12. For example, the thickness of the thinnest region of the binding layer 1113 between the first film layer 1111 and the second film layer 1112 adjacent to the first film layers 1111 is one-fifth, one-half, one time, two times, five times, etc., of the diameter of the optical fiber, which may not be limited herein.

Specifically, the thickness of the binding layer 1113 is not less than 50 μm, and may be 50 μm, 60 μm, 70 μm, and so on. When the binding layer 1113 is arranged, an anti-peeling strength between the first film layer 1111 and the second film layer 1112 adjacent to the first film layer 1111 is not less than 15 N/cm³.

Specifically, in an application scenario, the adhesive layer 1114 may be solid and flexible in a first temperature range and/or a first pressure range, and may have mobility in a second temperature range and/or a second pressure range. Any temperature in the first temperature range is not greater than any temperature in the second temperature range. Specifically, the binding layer 1114 may be solid and flexible at or near an ambient temperature and at or near the atmospheric pressure. When the binding layer 1114 is heated to reach a certain temperature and/or when a certain pressure is applied to the binding layer 1114, the binding layer 1114 has certain mobility. Specifically, the adhesive layer 1114 may be made of the thermoplastic material or the thermosetting material.

The material of the binding layer 1114 may be determined depending on actual environments in which the optical fiber circuit board assembly 10 is used. Specifically, when the optical fiber unit 12 is to be used at a high temperature, as described above, the optical fiber of the optical fiber unit 12 may be the high temperature fiber, and the bonding layer 1114 may be made of at least one of an epoxy resin system, an acrylic system, and a silicone system. When the optical fiber unit 12 is to be used at an ambient environment, as described above, the optical fiber of the optical fiber unit 12 may be the common optical fiber, and the binding layer 1114 may be made of at least one of an acrylic system and a silicone system.

When the adhesive layer 1114 is made of the above material and when the substrate 11 is heated and/or pressurized, the adhesive layer 1114 may flow and wrap around a periphery of the optical fiber unit 12 and may fill the space between the first film layer 1111 and the second film layer 1112 adjacent to the first film layer 1111 other than a space occupied by the optical fiber, such that the optical fiber may be fixed more firmly. In this way, the optical fibers, when being used for a long period of time, may not be loosened and displaced due to being arranged unfirmly, and reliability of the substrate 11 and the optical fiber circuit board assembly 10 may be improved.

As shown in FIGS. 5 to 8, in the present embodiment, the optical-electrical hybrid circuit board 100 includes: an optical fiber circuit board assembly 10, a printed circuit board 30, a first electronic element 40, and a plurality of optical elements 20.

The printed circuit board 30 is laminated on and spaced apart from the optical fiber circuit board assembly 10. The first electronic element 40 and the plurality of optical elements 20 are arranged on the printed circuit board 30. The first electronic element 40 is arranged at a position corresponding to the first opening 101. The plurality of optical elements 20 surrounds an outside the first electronic element 40. The optical elements 20 are coupled to the first electronic element 40 through the printed circuit board 30.

To be noted that the optical fiber circuit board assembly 10 in the present embodiment is the same as the optical fiber circuit board assembly 10 in the above mentioned embodiments of the present disclosure. Details of the optical fiber circuit board assembly 10 may refer to the above mentioned embodiments and will not be repeated here.

The first optical fiber interface 14 is configured to connect the optical fiber unit 12 to the optical element 20 for transmitting optical signals. The optical element 20 is specifically an optical energy converter or an optical transmission medium. Further, the optical energy converter may be a photoelectric conversion element. The first electronic element 40 may specifically be a chip, such as a router chip.

The optical element 20 includes an optical port (not shown). The optical port is configured to connect to the first fiber interface 14 for transmitting the optical signals. An angle of the optical port when being connected to the first fiber interface 14 is adjustable, such that the optical port of the optical element 20 may be facing towards an access direction of the first optical fiber unit. For example, when the optical fiber unit 12 is accessed from a left side of the optical-electrical hybrid circuit board 100, the optical port of the optical element 20 may be arranged to face towards the access direction of the optical fiber unit 12.

For the optical fiber circuit board in the art, the optical fiber is fixed to the surface or the substrate of the optical fiber circuit board by an adhesive. However, due to the signal line between the optical element and the first electronic element being excessively long, the chip, when being operating, may be electromagnetically interfered by the surrounding electromagnetic environment, and it may be difficult to ensure the chip to operate normally. In contrast to the prior art, in the present disclosure, the optical elements are surrounding the outside of the first electronic element, such that the signal line between the optical element and the first electronic element may be minimized, and parallel wires may be avoided. In this way, shortcomings in the art caused by the signal line between the optical element and the first electronic element being excessively long may be overcome.

In an embodiment, a support 60 is disposed between the printed circuit board 30 and the optical fiber circuit board assembly 10. Specifically, a mounting hole (not shown) may be defined in each of the printed circuit board 30 and the optical fiber circuit board assembly 10. In this case, the support 60 may be a screw, a rivet, a pin, and so on. The support 60 may be inserted into the mounting hole to secure the printed circuit board 30 to the optical fiber circuit board assembly 10. In this way, the printed circuit board 30 may be fixed to the optical fiber circuit board assembly 10 more firmly, and the printed circuit board 30 and the optical fiber circuit board assembly 10 may be detached apart from each other more easily.

In an embodiment, the plurality of optical elements 20 that are connected to the plurality of first fiber interfaces 14 are spaced apart from each other, and are distributed in a semi-enclosed or enclosed pattern. Further, the plurality of optical elements 20 are arranged in a single-annular array or in a double-annular array to increase the distribution density of the optical elements 20 and to increase the integrity of the optical-electrical hybrid circuit board 100.

As shown in FIG. 4, in an embodiment, the substrate body 11 further defines a second opening 102, and the second opening 102 is spaced apart from the first opening 101.

The optical-electrical hybrid circuit board 100 further includes a second electronic element 50. The second electronic element 50 is arranged on the printed circuit board 30. The second electronic element 50 is arranged at a position corresponding to the second opening 102 of the optical fiber circuit board assembly 10. The second opening 102 is defined to expose the second electronic element 50. The second electronic element 50 is specifically an electronic element having a high capacitance.

Figure 9:
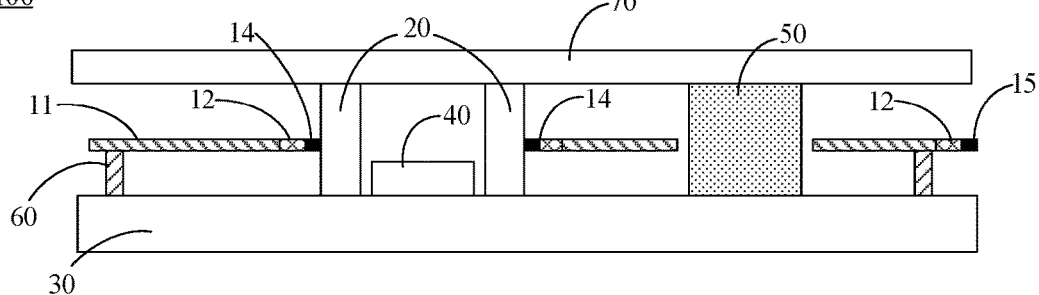
FIG. 9 is a structural schematic view of an optical-electrical hybrid circuit board according to a third embodiment of the present disclosure.

As shown in FIG. 9, further, since the optical element 20, the first electronic element 40, and the second electronic element 50 are exposed from the opening region of the substrate 11, the optical element 20, the first electronic element 40, and the second electronic element 50 may take one heat dissipator 70 to dissipate heat in subsequent processing. The heat dissipator 70 is arranged on a side of the optical element 20, the first electronic element 40, and the second electronic element 50 away from the printed circuit board 30. The heat dissipator 70 may be a water-cooling heat dissipator or a heat dissipator in other types, which will not be limited herein.

The above description shows only embodiments of the present disclosure but does not limit the scope of the present disclosure. Any equivalent structure or equivalent process transformation performed based on the specification and the accompanying drawings of the present disclosure, directly or indirectly applied in other fields, shall be equally covered by the scope of the present disclosure.

What is claimed is:

1. An optical fiber circuit board assembly, comprising:
    a substrate, comprising a substrate body, wherein the substrate body at least defines a first opening;
    a plurality of optical fiber units, arranged on the substrate, wherein an end of each of the plurality of optical fiber units extends to reach the first opening and is configured to couple with one optical element, and the other end of each of the plurality of optical fiber units extends to an outside of the substrate;
    wherein the optical element is a photoelectric conversion element;
    wherein the substrate further comprises: a plurality of first fiber outlets, the plurality of the first fiber outlets are protruding from a portion of the substrate body located at an inner side of the first opening towards a center of the first opening, and the plurality of optical fiber units are embedded in the substrate; and
    the optical fiber circuit board assembly comprises a first fiber interface, the end of each of the plurality of optical fiber units extends from one of the plurality of first fiber outlets to reach the first opening and is connected to the first fiber interface, and the first fiber interface is configured to connect to the optical element.

2. An optical fiber circuit board assembly, comprising:
    a substrate, comprising a substrate body, wherein the substrate body at least defines a first opening;
    a plurality of optical fiber units, arranged on the substrate, wherein an end of each of the plurality of optical fiber units extends to reach the first opening and is configured to couple with one optical element, and the other end of each of the plurality of optical fiber units extends to an outside of the substrate;
    wherein the substrate further comprises: a plurality of first fiber outlets, the plurality of the first fiber outlets are protruding from a portion of the substrate body located at an inner side of the first opening towards a center of the first opening, and the plurality of optical fiber units are embedded in the substrate; and
    the optical fiber circuit board assembly comprises a first fiber interface, the end of each of the plurality of optical fiber units extends from one of the plurality of first fiber outlets to reach the first opening and is connected to the first fiber interface, and the first fiber interface is configured to connect to the optical element.

3. The optical fiber circuit board assembly according to claim 2, wherein the plurality of first fiber outlets are spaced apart from each other and are arranged at the inner side of the first opening, and the plurality of first fiber outlets are distributed to semi-enclose or completely enclose the first opening.

4. The optical fiber circuit board assembly according to claim 3, wherein a distance between an end of one of the plurality of first fiber outlet and the center of the first opening is different from a distance between an end of another one of the plurality of first fiber outlets adjacent to the one first fiber outlet and the center of the first opening; and a distance between the end of one of the plurality of first fiber outlet and the end of the another one of the plurality of first fiber outlets adjacent to the one first fiber outlet is at least greater than or equal to a size of the optical element.

5. The optical fiber circuit board assembly according to claim 4, wherein the plurality of first fiber outlets are classified into at least two groups based on distances from the center of the first opening to the end of each of the plurality of first fiber outlets, and the two groups of first fiber outlets are alternately arranged.

6. The optical fiber circuit board assembly according to claim 2, wherein the substrate further comprises: a plurality of second fiber outlets, the plurality of the second fiber outlets are protruding outwardly from an outer side of the substrate; and the optical fiber circuit board assembly comprises a second fiber interface, the other end of each of the plurality of optical fiber units extends from one of the plurality of second fiber outlets and is connected to the second fiber interface.

7. The optical fiber circuit board assembly according to claim 6, wherein the plurality of second fiber outlets are spaced apart from each other and are all located on one side of the substrate.

8. The optical fiber circuit board assembly according to claim 2, wherein the substrate body comprises:
a first film layer and a second film layer laminated on and spaced apart from the first film layer, wherein at least some of the plurality of optical fiber units are disposed between the first film layer and the second film layer; and
a binding layer, received in the remaining space between the first film layer and the second film layer other than a space occupied by the some of the plurality of optical fiber units, wherein the plurality of optical fiber units are fixed relative to the first film layer.

9. The optical fiber circuit board assembly according to claim 8, wherein the first film layer is made of flexible material;
the second film layer and the binding layer are made of thermosetting material or thermoplastic material; and
the binding layer comprises two adhesive layers that are laminated with each other, at least some of the plurality of optical fiber units are disposed between the two the adhesive layers or arranged in one of the two adhesive layers.

10. The optical fiber circuit board assembly according to claim 8, wherein each of the first film layer and the second film layer is made of the flexible material;
the binding layer comprises two adhesive layers set in layers, at least some of the plurality of optical fiber units are disposed between the two adhesive layers or arranged inside one of the two adhesive layers, and each of the two adhesive layers is made of thermosetting material or thermoplastic material.

11. An optical-electrical hybrid circuit board, comprising:
an optical fiber circuit board assembly, comprising a substrate and a plurality of optical fiber units arranged on the substrate, wherein the substrate comprises a substrate body, the substrate body at least defines a first opening, an end of each of the plurality of optical fiber units extends to reach the first opening, each of the plurality of optical fiber units are configured to couple with one of a plurality of optical elements, and the other end of each of the plurality of optical fiber units extends to an outside of the substrate;
a printed circuit board, laminated on and spaced apart from the optical fiber circuit board assembly;
a first electronic element, arranged on the printed circuit board and arranged at a position corresponding to the first opening; and
the plurality of optical elements, arranged on the printed circuit board and surrounding an outside of the first electronic element, wherein the plurality of optical elements are coupled to the first electronic element through the printed circuit board;
wherein the substrate further comprises: a plurality of first fiber outlets; the plurality of the first fiber outlets are protruding from a portion of the substrate body located at an inner side of the first opening towards a center of the first opening, and the plurality of optical fiber units are embedded in the substrate; and
the optical fiber circuit board assembly comprises a first fiber interface, the end of each of the plurality of optical fiber units extends from one of the plurality of first fiber outlets to reach the first opening and is connected to the first fiber interface, and the first fiber interface is configured to connect to one of the plurality of optical elements.

12. The optical-electrical hybrid circuit board according to claim 11, wherein the plurality of optical elements are spaced apart from each other and are arranged to semi-surround or surround the first electronic element.

13. The optical-electrical hybrid circuit board according to claim 12, wherein the plurality of optical elements are arranged in a semi-annular array, in a single-annular array, or in a double-annular array.

14. The optical-electrical hybrid circuit board according to claim 11, further comprising an optical port, configured to connect to the first fiber interface to transmit optical signals; wherein an angle of the optical port is adjustable when the optical port is being connected to the first fiber interface.

15. The optical-electrical hybrid circuit board according to claim 11, wherein the substrate body further defines a second opening spaced apart from the first opening; and
the optical-electrical hybrid circuit board further comprises a second electronic element arranged on the printed circuit board, wherein the second electronic element is arranged at a position corresponding to the second opening of the optical fiber circuit board, and the second opening is defined to expose the second electronic element.

16. The optical-electrical hybrid circuit board according to claim 11, further comprising: a support, disposed between the printed circuit board and the optical fiber circuit board assembly.

17. The optical-electrical hybrid circuit board according to claim 11, wherein the substrate further comprises: a plurality of second fiber outlets; the plurality of the second fiber outlets are protruding outwardly from an outer side of the substrate; and the optical fiber circuit board assembly comprises a second fiber interface, the other end of each of the plurality of optical fiber units extends from one of the plurality of second fiber outlets and is connected to the second fiber interface.

18. The optical-electrical hybrid circuit board according to claim 11, wherein the substrate body comprises:
a first film layer and a second film layer laminated on and spaced apart from the first film layer, wherein at least some of the plurality of optical fiber units are disposed between the first film layer and the second film layer; and
a binding layer, received in the remaining space between the first film layer and the second film layer other than a space occupied by the some of the plurality of optical fiber units, wherein the plurality of optical fiber units are fixed relative to the first film layer.

* * * * *